US012579543B2

(12) United States Patent
Yip et al.

(10) Patent No.: US 12,579,543 B2
(45) Date of Patent: *Mar. 17, 2026

(54) HIERARCHICAL DIGITAL ISSUANCE TOKENS AND CLAIM TOKENS

(71) Applicant: Goldman Sachs & Co. LLC, New York, NY (US)

(72) Inventors: Chi Kit Yip, Hong Kong (HK); Chong Kiat Joseph Chua, Singapore (SG)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/235,129

(22) Filed: Jun. 11, 2025

(65) Prior Publication Data

US 2025/0307805 A1     Oct. 2, 2025

Related U.S. Application Data

(63) Continuation of application No. 18/490,854, filed on Oct. 20, 2023, now Pat. No. 12,361,411, which is a
(Continued)

(51) Int. Cl.
| | |
|---|---|
| *G06Q 20/38* | (2012.01) |
| *G06Q 20/36* | (2012.01) |
| *G06Q 20/40* | (2012.01) |

(52) U.S. Cl.
CPC ....... *G06Q 20/3825* (2013.01); *G06Q 20/367* (2013.01); *G06Q 20/4016* (2013.01); *G06Q 2220/00* (2013.01)

(58) Field of Classification Search
CPC ............. G06Q 20/3825; G06Q 20/367; G06Q 20/4016; G06Q 2220/00
(Continued)

(56) References Cited

U.S. PATENT DOCUMENTS

| | | |
|---|---|---|
| 10,708,042 B1 | 7/2020 | Rubenstein et al. |
| 10,860,259 B1 | 12/2020 | Winarski |

(Continued)

FOREIGN PATENT DOCUMENTS

| | | |
|---|---|---|
| WO | WO 2020/033830 A1 | 2/2020 |
| WO | WO-2020/160530 A1 | 8/2020 |

(Continued)

OTHER PUBLICATIONS

PCT International Search Report and Written Opinion, PCT Application No. PCT/1B2023/060691, Mar. 18, 2024, 17 pages.
(Continued)

*Primary Examiner* — Courtney P Jones
(74) *Attorney, Agent, or Firm* — Fenwick & West LLP

(57)     ABSTRACT

In a first tier of a hierarchy, a record is maintained of assets issued or otherwise made available by an issuer. The available assets may be distributed between accounts within the first tier. Ownership of the assets is recorded on a distributed ledger. One or more of the first-tier accounts may be held by first tier investors (such as institutional investors) that buy and hold some of the available assets as a direct/primary investment. One or more other first-tier accounts may be client omnibus accounts operated by financial institutions that hold a portion of the available assets and make those assets available to be invested in by second-tier accounts. Interests in the assets made available for investment by second-tier accounts are recorded on the distributed ledger. In some instances, second-tier accounts can offer investment in the interests the second-tier accounts hold to third-tier accounts, and third-tier accounts can offer interests to fourth tier accounts, etc.

20 Claims, 4 Drawing Sheets

300

Related U.S. Application Data continuation of application No. PCT/IB2023/060572, filed on Oct. 19, 2023.

(60) Provisional application No. 63/419,666, filed on Oct. 26, 2022, provisional application No. 63/380,573, filed on Oct. 23, 2022.

(58) Field of Classification Search
USPC .......................................................... 705/65
See application file for complete search history.

(56) References Cited

U.S. PATENT DOCUMENTS

| | | |
|---|---|---|
| 11,044,098 B1 | 6/2021 | Thacker et al. |
| 11,282,139 B1 | 3/2022 | Winklevoss et al. |
| 11,308,487 B1 | 4/2022 | Foster et al. |
| 11,334,883 B1 | 5/2022 | Auerbach et al. |
| 12,026,684 B2 | 7/2024 | Patel et al. |
| 12,026,697 B2 | 7/2024 | Polasa et al. |
| 2019/0012662 A1 | 1/2019 | Krellenstein et al. |
| 2019/0080406 A1 | 3/2019 | Molinari et al. |
| 2019/0303892 A1 | 10/2019 | Yantis et al. |
| 2020/0042989 A1 | 2/2020 | Ramadoss et al. |
| 2020/0051043 A1* | 2/2020 | Wilson ................. G06Q 20/389 |
| 2020/0051069 A1 | 2/2020 | Wilson et al. |
| 2020/0051166 A1 | 2/2020 | Loh et al. |
| 2020/0065802 A1 | 2/2020 | Mathieson et al. |
| 2020/0092106 A1 | 3/2020 | Leong |
| 2020/0175601 A1 | 6/2020 | Letourneau |
| 2020/0184431 A1* | 6/2020 | Sinmao ................. G06Q 20/223 |
| 2020/0250752 A1 | 8/2020 | Sugarman |
| 2020/0294129 A1 | 9/2020 | Celia |
| 2020/0394651 A1 | 12/2020 | Kreder et al. |
| 2021/0073913 A1 | 3/2021 | Ingargiola |
| 2021/0150626 A1 | 5/2021 | Robotham |
| 2021/0273814 A1 | 9/2021 | Lee |
| 2021/0319428 A1 | 10/2021 | Yantis et al. |
| 2021/0350458 A1 | 11/2021 | Gaur et al. |
| 2021/0398112 A1 | 12/2021 | Ward et al. |
| 2022/0027902 A1 | 1/2022 | Vandenberg et al. |
| 2022/0076334 A1 | 3/2022 | Filter |
| 2022/0130005 A1 | 4/2022 | Xu |
| 2022/0147983 A1* | 5/2022 | Marsh .................... G06Q 20/10 |
| 2023/0085691 A1 | 3/2023 | Gaur et al. |
| 2023/0104103 A1* | 4/2023 | Eby ................... G06Q 20/3678<br>705/69 |
| 2023/0173395 A1 | 6/2023 | Cella et al. |
| 2023/0298005 A1 | 9/2023 | Saad et al. |
| 2025/0077625 A1 | 3/2025 | Coleman et al. |

FOREIGN PATENT DOCUMENTS

| | | |
|---|---|---|
| WO | WO-2024/054665 A1 | 3/2024 |
| WO | WO-2025/038873 A1 | 2/2025 |

OTHER PUBLICATIONS

PCT International Search Report and Written Opinion, PCT Application No. PCT/IB2023/060572, Jan. 23, 2024, 10 pages.

United States Office Action, U.S. Appl. No. 18/492,394, filed Apr. 10, 2025, 21 pages.

United States Office Action, U.S. Appl. No. 18/492,477, filed Apr. 17, 2025, 21 pages.

United States Office Action, U.S. Appl. No. 18/492,424, filed May 16, 2025, 37 pages.

United States Office Action, U.S. Appl. No. 18/492,448, filed Jun. 13, 2024, 18 pages.

United States Office Action, U.S. Appl. No. 18/490,854, filed Mar. 15, 2024, 24 pages.

United States Office Action, U.S. Appl. No. 18/490,854, filed Jul. 24, 2024, 15 pages.

United States Office Action, U.S. Appl. No. 18/490,854, filed Jan. 31, 2025, 12 pages.

European Patent Office, Extended European Search Report and Opinion, European Patent Application No. 23882057.5, Jul. 25, 2025, nine pages.

United States Office Action, U.S. Appl. No. 18/492,424, filed Sep. 10, 2025, 14 pages.

United States Office Action, U.S. Appl. No. 18/492,448, filed Sep. 15, 2025, 19 pages.

United States Office Action, U.S. Appl. No. 18/492,477, filed Oct. 17, 2025, 20 pages.

* cited by examiner

300

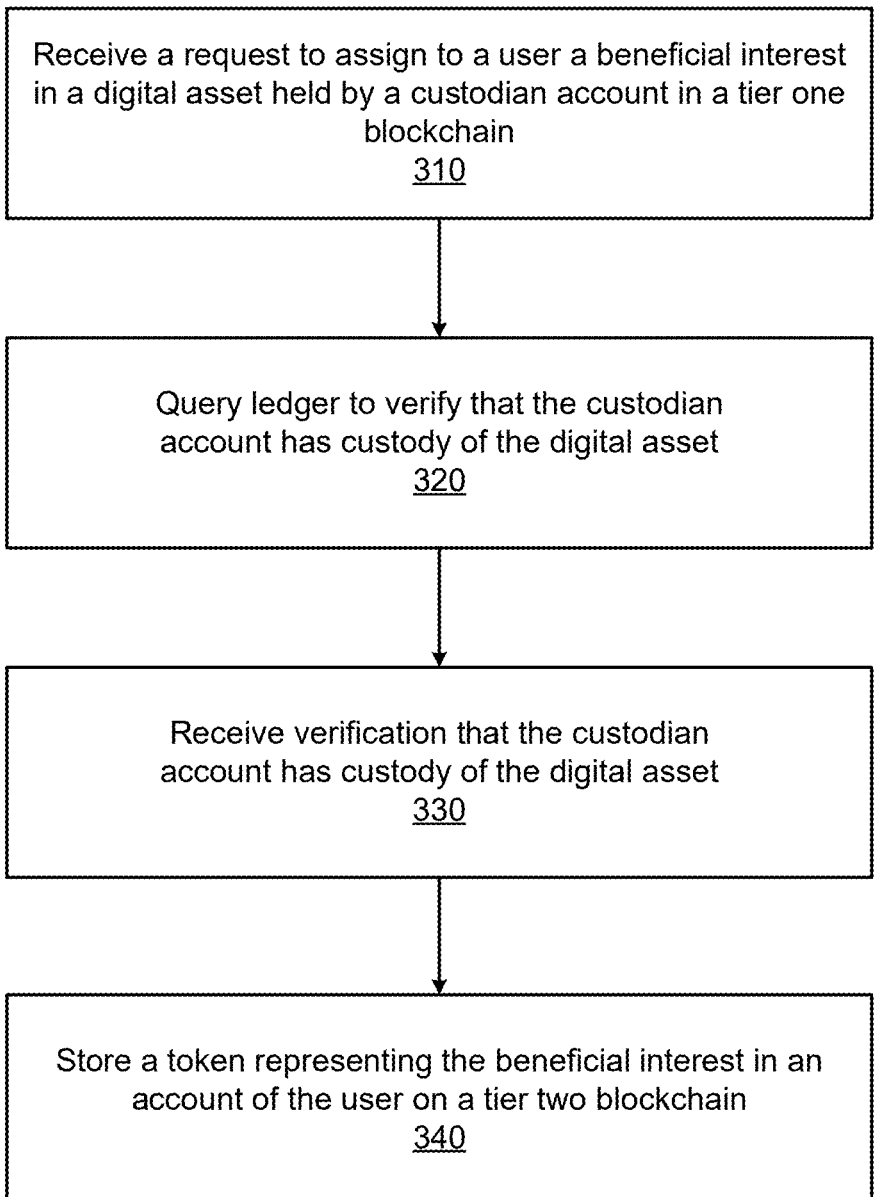

Receive a request to assign to a user a beneficial interest in a digital asset held by a custodian account in a tier one blockchain
310

Query ledger to verify that the custodian account has custody of the digital asset
320

Receive verification that the custodian account has custody of the digital asset
330

Store a token representing the beneficial interest in an account of the user on a tier two blockchain
340

FIG. 3

HIERARCHICAL DIGITAL ISSUANCE TOKENS AND CLAIM TOKENS

CROSS-REFERENCE TO RELATED APPLICATIONS

This Application is a continuation of U.S. patent application Ser. No. 18/490,854, filed on Oct. 20, 2023, which is a continuation of PCT Application No. PCT/IB2023/060572, filed on Oct. 19, 2023, and claims the benefit of U.S. Provisional Patent Application Nos. 63/380,573, filed on Oct. 23, 2022, and 63/419,666, filed on Oct. 26, 2022. Each of the above Applications is incorporated by reference.

TECHNICAL FIELD

The disclosure relates generally to the field of distributed ledger technology (DLT), and, in particular, to using a hierarchy of digital asset tokens and claim tokens to manage registry, custody, and ownership of digital assets on DLT.

BACKGROUND

Distributed ledgers (e.g., blockchains) were developed as a means for parties to engage in transactions, e.g., financial transactions, without the need for a single, trusted intermediary. In such systems, each transaction is recorded independently by several nodes. In some implementations, no single entity controls all of the nodes so it is exceedingly difficult for a malicious actor to alter the transaction once it has been recorded by the nodes. Even in implementations where a single entity controls all of the nodes, it is still exceedingly difficult to alter the data recorded on sufficient nodes to change the consensus indicated by all of the nodes without leaving an indication that the data has been tampered with.

There are many scenarios where it is beneficial for custody of an asset to be distinct and separate from ownership of the asset. For example, investors may purchase securities in gold bars or other precious metals, but the physical metal ingots typically remain in the custody of a bank or other financial institution. However, conventional blockchain digital asset systems often do not distinguish between custody and ownership. Thus, these conventional blockchain digital asset systems are not well suited to providing primary issuance and secondary trading (potentially in multiple levels of a hierarchy) for investment in digital assets.

SUMMARY

The above and other problems may be solved using hierarchical digital asset tokens and claim tokens. In a first tier of a hierarchy, a Digital Securities Issuance record (which defines the number of securities issued/made available by the issuer) is deployed as a smart contract on the platform. This Issuance record is maintained by the Registrar/Central Securities Depositories/Central Account Keeper and is used to reconcile against the Digital Asset token holdings within the first-tier accounts (or wallets). In this disclosure, the term account is used to represent the concept of a wallet or account in various DLT ledgers and should be broadly construed to include any such digital construct that can record ownership of digital tokens.

The available assets may be distributed between accounts within the first tier. Ownership of the assets is recorded on a blockchain for the first tier. One or more of the first-tier accounts may be self-custody accounts of first tier investors (such as institutional investors) that buy and hold some of the available assets as a direct/primary investment (if permitted by the relevant regulatory requirements). One or more other first tier accounts may also be provider accounts operated by financial institutions (acting as Custodian) that hold a portion of the available assets and make those assets available to be invested in by second-tier accounts. Interests in the assets made available for investment by second-tier accounts are recorded on one or more blockchains for the second tier. The first-tier accounts may also include risk accounts for the financial institutions that hold a portion of the available assets for their own benefit. In some embodiments, second-tier accounts can offer investment in the interests the second-tier accounts hold to third-tier accounts, etc. The hierarchy can have an arbitrarily large number of tiers, with each tier having interests in the holdings of the tier above it recorded on one or more blockchains.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 3 is a flowchart of a method for assigning a second-tier ownership or beneficial interest in a first-tier digital asset to a user, according to one embodiment.

DETAILED DESCRIPTION

The figures and the following description describe certain embodiments by way of illustration only. One skilled in the art will readily recognize from the following description that alternative embodiments of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

Example Systems

Figure 1:
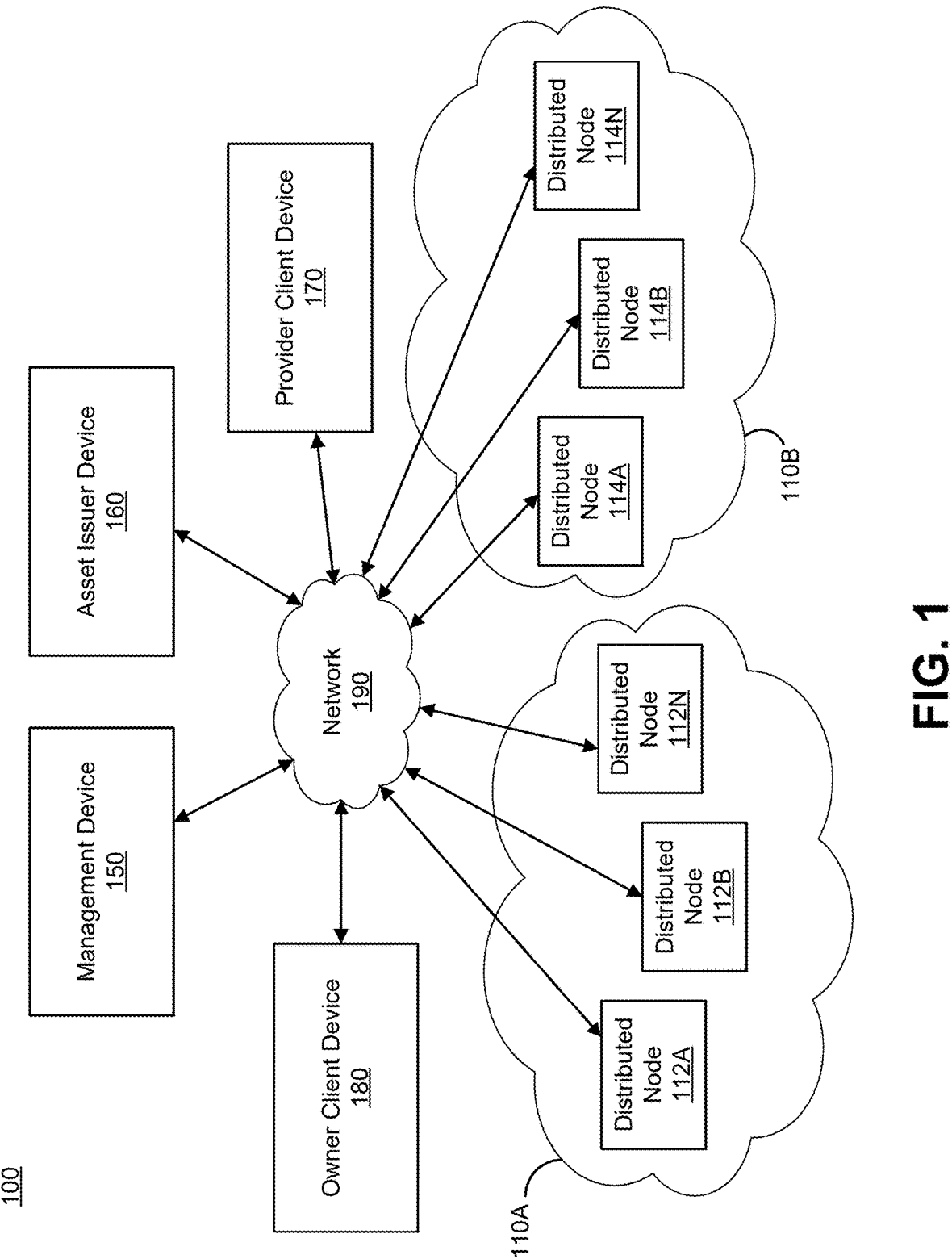
FIG. 1 is a block diagram that illustrates a networked computing environment in which hierarchical claim tokens may be used to provide custody and ownership interests for digital assets, according to one embodiment.

FIG. 1 illustrates one embodiment of a networked computing environment 100 environment in which hierarchical claim tokens may be used to provide custody and ownership interests for digital assets. In the embodiment shown, the networked computing environment 100 includes a first distributed ledger 110A including a first set of distributed nodes 112, and a second distributed ledger 110B including a second set of distributed nodes 114, a management device 150, an asset issuer device 160, a provider client device 170, an owner client device 180, all connected via a network 190. In other embodiments, the networked computing environment 100 includes fewer, different, or additional elements. In addition, the functions may be distributed among the elements in a different manner than described.

FIG. 1 shows two distributed ledgers 110A and 110B for illustrative purposes. In practice, the networked computing environment may include any number of distributed ledgers. For example, in one embodiment, a single, permissioned distributed ledger is used to store all digital assets as well as tokens representing beneficial interests in those assets at all tiers of a hierarchy while in another embodiment, one or more of the tiers of the hierarchy store tokens representing beneficial interests in the digital assets in one or more distributed ledgers that are distinct from a distributed ledger used to store the digital assets. In FIG. 1, the first distributed ledger 110A is shown as including three distributed nodes 112, a first distributed node 112A, a second distributed node 112B, and an Nth distributed node 112N. Similarly the second distributed ledger 110B is shown as including a first distributed node 114A, a second distributed node 114B, and an Nth distributed node 114N. In practice, each distributed ledger 110 can (and likely will) include many more nodes.

The distributed nodes 112, 114 are computing devices. The distributed nodes may manage and provide a blockchain or other type of distributed ledger. The distributed nodes can also store and execute the rules set by a smart contract. Thus, when the triggering conditions of a smart contract are met, one or more operations may be automatically performed by the distributed nodes 112, 114. In various embodiments, the distributed nodes can operate independently from the management device 150. When an event or data relevant to a smart contract is generated, relevant information may be added to a block of the blockchain. The blockchain and smart contract can codify and automatically enforce rules governing ownership of and investment in digital assets.

When a distributed node 112 or 114 receives a request to conduct a transaction it confirms or denies whether the relevant data of the transaction is consistent with its records. A transaction is considered successfully verified if a threshold amount of the distributed nodes agree that the transaction is consistent with their records. For example, a Byzantine fault tolerance approach may be used to determine whether sufficient nodes confirm the validity of a transaction to verify the transaction. Similarly, an action defined in a rule of a smart contract may be triggered if a threshold amount of the distributed nodes agree that a triggering condition for the action has been met.

A distributed ledger 110 generally takes one the following forms:

A single global ledger which is maintained by all the nodes within the blockchain network; or A global ledger which is made up of multiple local ledgers which are maintained by the individual nodes within the network.

In DLT embodiments that use a single global ledger, when a change to the blockchain is made (e.g., when a new transaction or block is created), the nodes form a consensus as to how the change is integrated into the network of distributed nodes. Upon consensus, the agreed upon change is considered confirmed such that each node maintains a copy that should match the copies stored by other nodes. Any change that does not achieve a consensus may be ignored. Accordingly, unlike a traditional, centralized ledger, a single party cannot unilaterally alter the blockchain.

In embodiments of DLT that use a global ledger made up of multiple local ledgers, when a transaction is submitted to the network, the involved nodes validate and provide the confirmation of the validity of the transaction. Upon consensus, the agreed upon change is considered confirmed and shall be used to update the contract states within the local ledger of the relevant nodes. Unlike in embodiments that use a single global ledger, each of the nodes maintains its own private state of the ledger, which collectively forms the global ledger.

The blockchain may also include smart contracts, which are a set of executable instructions stored in conjunction with one or more triggering conditions. If the triggering conditions are met, the smart contract is triggered to execute the corresponding instructions. Each distributed node 112, 114 may receive the definition of a smart contract but any outcomes resulting from execution of the code within the smart contract are only validated if consensus is reached among the nodes as to the state of the smart contract (e.g., sufficient nodes agree that the triggering conditions have been met and execution of the instructions leads to a particular outcome). In other embodiments, other types of distributed ledger may be used.

A management device 150 is a computing device that provides services to other devices in the networked computing environment 100 to provide the hierarchical claim tokens. Although only one management device 150 is shown, any number of management devices may be included in the networked computing environment 100. A management device 150 provides and manages the hosting of parties. A party may be an individual or a legal entity which will be executing commands to interact with the ledger. In one embodiment, a party is assigned to the various roles through the use of smart contract which govern what ledgers and data objects (e.g., smart contracts) that a party may view and modify. A party's permissions within the networked computing environment may be stored in a smart contract (referred to as a "service") that is generated from the party's assigned roles and stored in a distributed ledger (e.g., the first distributed ledger 110A or the second distributed ledger 110B).

A management device 150 may also manage accounts within the networked computing environment. In general, an account involves two parties: the account provider and the account owner. The account provider is a party that has been assigned the Custodian role and has access to the custodian service functionalities. Generally, any party can be an account owner subject to KYC/AML rules which may lead to a party being banned from using the networked computing environment 100. In one embodiment, when an account owner and provider agree to open a new account, the management device 150 creates a smart contract with information about the account, such as identifiers of the account, the account owner, and the account provider, as well as a KYC status of the account (e.g., active, special, non-trading, or terminated). The respective Custodian/account provider periodically updates the KYC status of the account.

Other than the node hosting option, the management device 150 may also provide an interface, such as an application programming interface (API) through which other devices in the networked computing environment may make submissions to the one or more distributed ledgers. In one embodiment, the management device 150 provides an interface for a first-tier account in an account hierarchy. The first-tier account stores tokens for digital assets and lower-tier accounts may store tokens indicating claims to the digital assets in the first tier. For example, qualified institutional investors may be able to own digital assets at the first tier and provide investment opportunities to other investors in one or more secondary markets by issuing tokens to the lower-tier accounts. In one embodiment, the tokens in all tiers are stored in a single blockchain. Alternatively, some or all of the tokens in the second tier (and lower tiers, where used) may be stored on separate blockchains from the one storing the first-tier tokens. Various embodiments of the distributed ledger hierarchy are described in greater detail below, with reference to FIG. 2.

An asset issuer device 160 is a computing device with which a user (e.g., a government or private institution) may create (i.e., issue) digital assets. Although only one asset issuer device 160 is shown, the networked computing environment can include any number of such devices. In one embodiment, smart contracts which capture the asset attributes (e.g., a type, initial value, interest rate, lifetime, payout amount at maturity, amount available, etc.) are deployed to the ledger and are made available to other nodes that are entitled to see these contracts. The Asset Issuer can choose to use the API interface exposed by the management device 150 to create data objects representing each instance of the asset in a distributed ledger. Alternatively, by hosting its own node, the asset issuer device 160 may create the data objects representing the assets directly in the ledger.

The provider client device 170 and owner client device 180 are computing devices with which users (e.g., an employee of a financial institution and an account owner, respectively) may interact with a distributed ledger, such as distributed ledger 110A or distributed ledger 110B. Although only one provider client device 170 and one owner client device 180 are shown, in practice, the networked computing environment 100 can include any number of such devices. In one embodiment, during account creation, the provider client device 170 receives an account creation request from an owner client device 180, provides its approval, and then formulates/creates the smart contract for the account (e.g., including identifiers of the provider and owner as well as KYC information) in the distributed ledger (either directly or via the management device 150). A user may also submit requests to buy and sell digital assets using an owner client device 180. Depending on the embodiment, such requests may be submitted directly to the appropriate distributed ledger or to a provider client device 170 or management device 150 for processing.

The network 190 provides the communication channels via which the other elements of the networked computing environment 100 communicate. The network 190 can include any combination of local area or wide area networks, using both wired or wireless communication systems. In one embodiment, the network 190 uses standard communications technologies or protocols. For example, the network 190 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 190 include multiprotocol label switching (MPLS), gRPC Remote Procedure Calls (GRPC), transmission control protocol/Internet protocol (TCP/IP), hypertext transport protocol (HTTP), simple mail transfer protocol (SMTP), and file transfer protocol (FTP). Data exchanged over the network 190 may be represented using any suitable format, such as hypertext markup language (HTML) or extensible markup language (XML). In some embodiments, all or some of the communication links of the network 190 may be encrypted using any suitable technique or techniques.

Figure 2:
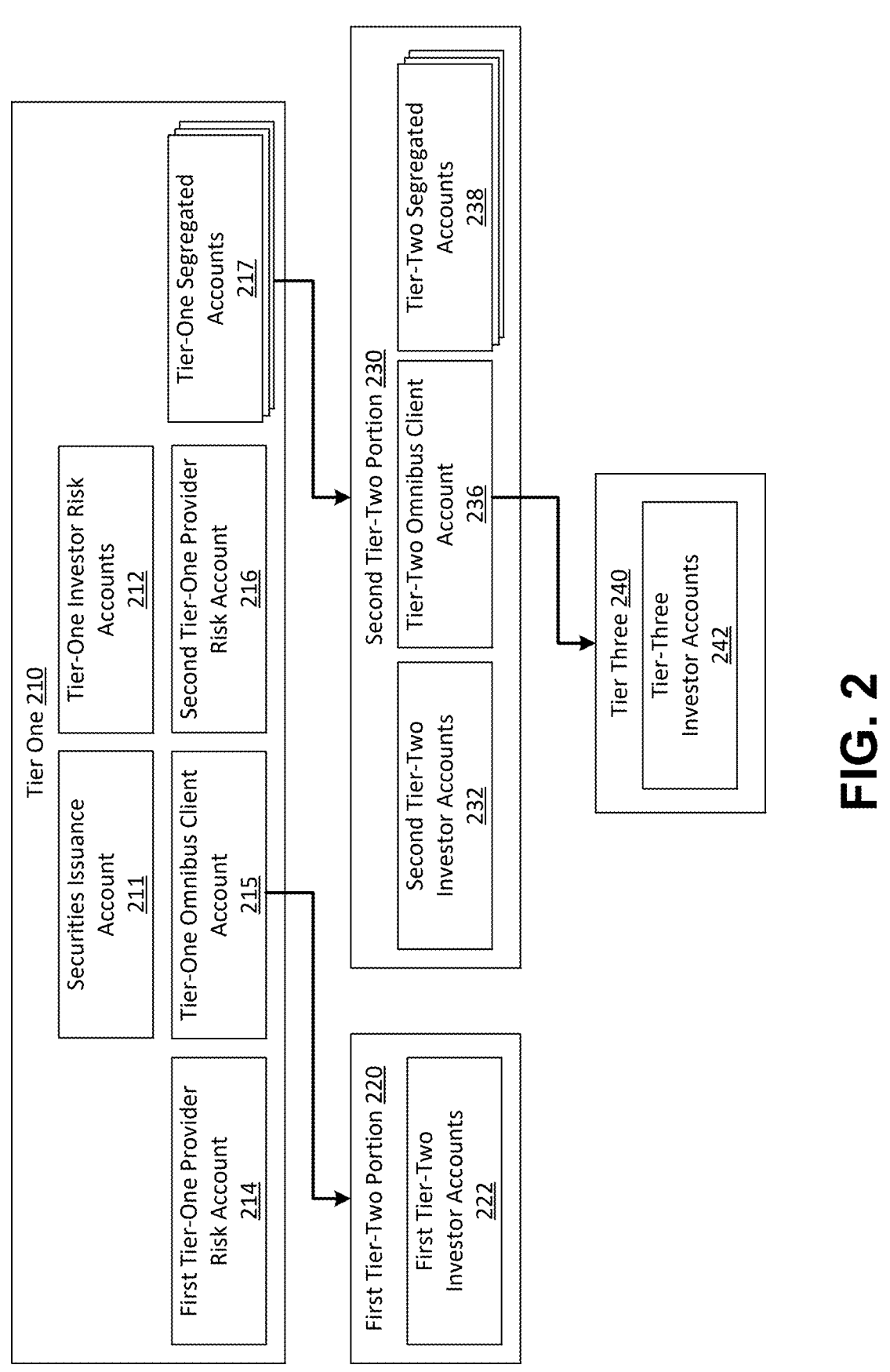
FIG. 2 is a block diagram of a set of accounts using hierarchical claim tokens to provide secondary and tertiary interests in a digital asset, according to one embodiment.

FIG. 2 illustrates one embodiment of a tiered hierarchical account structure which has the custodian holding on to the securities within the tier-one accounts and provides claim tokens for digital assets within the tier-two accounts. In the embodiment shown, the account structure is arranged in a hierarchy with three tiers. However, there may in principle be any number of tiers within the hierarchy. Each additional tier enables providers holding tokens in the tier above to further split the ownership or beneficial interests represented by those tokens into parts, represented by further tokens in the lower tier. The tiers may all be stored on a single blockchain with permissions being used to control what information each participating entity may view. Alternatively, an entity that has custody of an asset in tier one can operate a separate blockchain to record beneficial interests in the assets over which it has custody.

Tier one 210 of the hierarchical account structure handles digital custody of the assets themselves. Custody of the digital assets is typically limited to a small number of qualified institutional investors depending on jurisdictional requirements (e.g., some jurisdictions do not allow institutional investors to do self-custody). Controls are implemented to only allow the owners of the accounts to transfer/move the assets within the accounts as well as to view the holdings. Tier-one accounts may provide ownership or beneficial interests in the assets over which they have custody to other users, may hold the assets as self-custodians for their own benefit, or both. In the embodiment shown in FIG. 2, tier one 210 includes a securities issuance account 211 (to contain the asset when it is first originated on the ledger), one or more tier-one investor risk accounts 212, a first tier-one provider risk account 214, a tier-one provider omnibus-client account 215, a second tier-one provider risk account 216, and one or more tier-one segregated accounts 217. As described previously, each account may be a blockchain address or wallet or an account defined within the ledger, depending on the DLT technology used. In other embodiments, tier one 210 may include different or additional elements. For example, any number of providers may have risk and omnibus-client/segregated accounts in the tier one ledger 210.

The securities issuance account (or securities issuance record) 211 is where the initial issuance of a set of assets is recorded. Thus, information about the assets and the number of assets issued is stored using a smart contract, which may be used for reconciliation against the tier one asset holdings. The securities issuance account 211 is different from a transaction account (used to store the securities). The securities issuance account 211 does not have custody of the assets nor indicate legal ownership of the assets, rather it serves as a registration of the assets.

The tier-one investor risk accounts 212 are for accounts that are authorized to transact in the first-tier ledger 210 (e.g., institutional investors) that wish to self-custody (i.e., hold accounts directly with the registrar) of the asset. The tier-one investor risk accounts 212 hold investor principal positions In the example shown, there is both a tier-one omnibus client account 215 (which stores tokens for multiple entities in a single account) and one or more tier-one segregated accounts 217 (with each segregated account storing tokens for a single entity). Depending on local regulatory requirements and client preferences, the hierarchy may use just a tier-one omnibus client account 215, only a set of tier-one segregated accounts 217, or a combination of both (e.g., where local law and regulations allow omnibus accounts but one or more clients elect to us segregated accounts). Furthermore, although specific numbers of various types of account are shown, the first tier may include accounts of each type for any number of providers that make investment in the digital assets available to second-tier users.

In some embodiments, providers may have a risk account and a holding account. The purpose of the custodian to hold a risk account and omnibus account is to segregate the clients' custody assets (kept in the client omnibus account) versus its propriety assets (kept in risk account). However, in typical configurations, custodians do not hold proprietary assets and thus do not need (and thus may not have) risk accounts. That said, for the sake of completeness, FIG. 2 shows a first tier-one provider risk account 214 that may hold digital assets that the custodian holds on its firm-capacity and a tier-one provider omnibus client account 215 that has custody over digital assets for which the provider makes ownership or beneficial interests available to second-tier users as well as digital assets over which other tier-one participants have custody. Similarly, the second tier-one provider risk account 216 has custody over digital assets held by the second provider for principal investment. However, the second provider has a tier-one segregated account 217 in which it holds digital assets for which it provides beneficial interests to second-tier users that are segregated from digital assets for which other tier-one participants are the custodian.

Accounts in the second tier hold tokens representing ownership or beneficial interests in the digital assets that sits in the custodian-managed account in tier one 210. The second-tier accounts do not have custody over the digital assets themselves instead they hold claims issued by the respective securities custodian. This may be implemented by an ownership or beneficial interest smart contract that is signed by the custodian account. In the embodiment shown in FIG. 2, the second tier includes a first portion 220 and a second portion 230. Each tier-two portion corresponds to a different custodian in tier one. In one embodiment, the accounts in the tier-two portions 220 and 230 are part of the same ledger that includes the tier-one accounts. Alternatively, some or all of the tier-two accounts may be stored on different ledgers. Note that although the first tier-two portion 220 is shown as branching from tier-one omnibus client account 215 and the second tier-two portion 230 is shown as branching from a tier-one segregated account 217, the tier-two portions may branch off any combination of the tier-one omnibus client account, segregated accounts, or both.

The first tier-two portion 220 is for the first tier-one provider. In this case, the first tier-one provider/custodian safeguards the securities for the tier-two clients by holding the securities in the omnibus account and indicating the ownership or beneficial interests in the digital assets to tier-two accounts using claim tokens issued by the custodian held within the tier-two accounts, but none of those second-ary users further divide the ownership or beneficial interests for tier-three accounts. Thus, the accounts in the first tier-two portion 220 hold the digital assets for the tier-two investors. The digital assets holdings in the Custodian omnibus account reconciles against the claim tokens that sit in the tier-two investor accounts provided by the Custodian. When a tier-two user invests in the digital assets for which the first tier-one provider is a custodian, a token representing an ownership or beneficial interest in the digital assets (or a portion of a digital asset) is added to the tier-two user's account 222.

The second tier-two portion 230 similarly includes second tier-two investor accounts 232 that may store claim tokens (issued by the Custodian) representing ownership or ben-eficial interests in digital assets (or portions of a digital asset) for which the second tier-one provider is custodian. The second tier-two portion 230 can include an omnibus client account 236 that further subdivides the ownership or ben-eficial interests it holds and makes the parts of the subdi-vided ownership or beneficial interest available to third-tier investors, tier-two segregated accounts that store tokens representing beneficial interests held by individual tier-two participants, or a combination of both. The tier-two omnibus client account 236 functions similarly to a tier-one omnibus client account (e.g., tier-one omnibus client account 215) except that rather than being a custodian of a digital asset, the tier-two omnibus client account 236 holds ownership or beneficial interests in an asset for multiple tier-two partici-pants, some or all of whom may make ownership or ben-eficial interests in those interests available to third-tier investors. The tier-two segregated accounts 238 are similar to the tier-one segregated accounts 217 except that they store ownership or beneficial interests of individual tier-two par-ticipants, some or all of whom may make ownership or beneficial interests in those interests available to third-tier investors.

Tier three 240 includes accounts 242 of tier-three users that obtain ownership or beneficial interests from a tier-two provider. It should be noted that the tier-three ledger 240 may also include one or more provider accounts that make ownership or beneficial interests in the digital assets avail-able to fourth-tier users, and so on up to an arbitrary number of tiers. An advantage of using the tiered structure shown in FIG. 2 is that it provides privacy control and only allows the account provider to know the clients holding and provides that reconciliation holds between the assets they custody for and the number of claim tokens issued to custody clients. For example, the second tier-one provider may only need to know what ownership or beneficial interests it has given to tier-two users. It may not need to know whether the tier-two users are holding these interests for their own benefit or have further passed them on to tier-three users. Furthermore, as the tier-one users remain custodians of the digital assets, when ownership or beneficial interests are traded on tier two 220 and 230, tier one 210 can remain unchanged. Similarly, tier two 220 and 230 may remain unchanged if beneficial interests are exchanged or traded in tier three 240, etc.

Another advantage of the hierarchical structure is that different tier-two (or lower) portions may be used to provide trading of ownership or beneficial interests in different jurisdictions. Each tier-two portion 220, 230 may be con-figured to comply with local regulatory requirements for the trading of securities. Thus, tier one 210 may be universal and include custody of the underlying digital assets while tier two can provide trading of securities of the same underlying assets to different markets with different regulatory require-ments.

Example Methods

FIG. 3 illustrates one embodiment of a method 300 for assigning an ownership or beneficial interest in a digital asset to a user. The steps of FIG. 3 are illustrated from the perspective of a computing device managing interactions with distributed ledger (e.g., a provider client device 170) performing the method 300. However, some or all of the steps may be performed by other entities or components. In addition, some embodiments may perform the steps in parallel, perform the steps in different orders, or perform different steps.

In the embodiment shown in FIG. 3, the method 300 begins with the computing device receiving 310 a request to assign an ownership or beneficial interest in the digital asset to the user/act as a custodian for a user. The digital asset (represented by a smart contract on the distributed ledger) is held within the custodian's account. The computing device/

Custodian can verify the custody relationship by querying 320 the ledger for the Custody service contract which contains the signatories of the Custodian and the client. The computing device receives 330 a response to the query verifying that the custodian account has custody of the digital asset. The custodian may verify it has custody of the digital asset by confirming that the digital asset token smart contract held by the custodian account contains the signatories of the registrar and issuer of the digital asset. Assuming that custody is established between the custodian and client through the use of smart contract. After the settlement takes place, the tier-two account stores 340 a token representing the ownership or beneficial interest in the digital asset in the custodian account on the distributed ledger (the user's account being a smart contract on the distributed ledger). The user's ownership or beneficial interest (represented by the claim token smart contract) may be signed with the custodian's digital signature to confirm its authenticity. In this way, the user's ownership or beneficial interest in the digital asset may be recorded without altering the tier-one blockchain that governs custody of the digital asset.

Computing System Architecture

Figure 4:
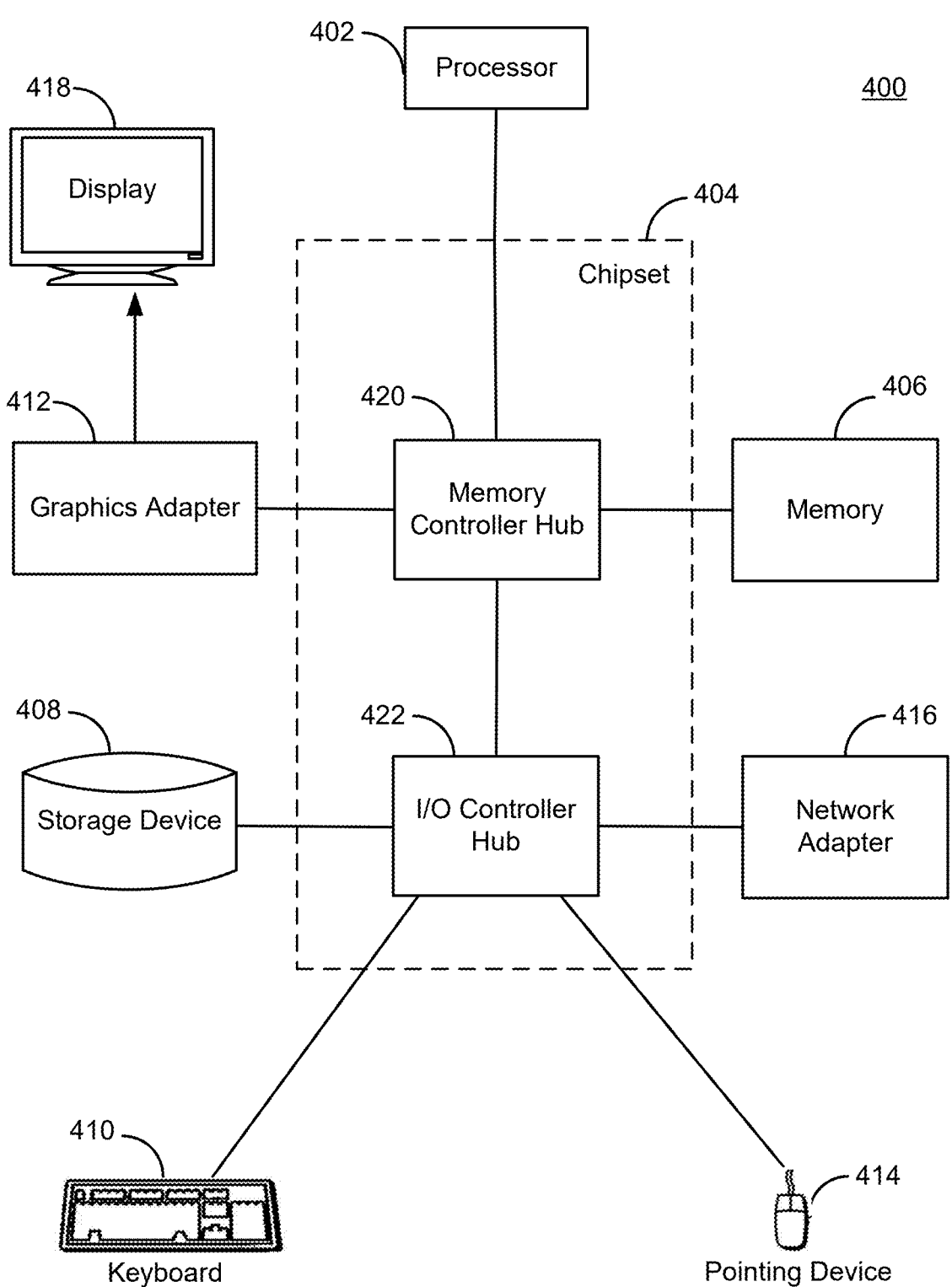
FIG. 4 is a block diagram of an example of a computer suitable for use in the networked computing environment of FIG. 1, according to one embodiment.

FIG. 4 illustrates an example computer 400 suitable for use as a management device 150, asset issuer device 160, provider client device 170, owner client device 180, or distributed node 112 or 114, according to one embodiment. The example computer 400 includes at least one processor 402 coupled to a chipset 404. For convenience, various operations may be described as being performed by "a processor 402." It should be understood that this means that the stated operations are performed by one or more processors working either individually or cooperatively. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, keyboard 410, pointing device 414, and network adapter 416 are coupled to the I/O controller hub 422. Other embodiments of the computer 400 have different architectures.

In the embodiment shown in FIG. 4, the storage device 408 is a non-transitory computer-readable storage medium such as a hard drive, compact disk read-only memory (CD-ROM), DVD, or a solid-state memory device. The memory 406 holds instructions, e.g., to perform the methods described above, and data used by the processor 402. The pointing device 414 may be a mouse, track ball, touchscreen, or any other type of pointing device, and may be used in combination with the keyboard 410 (which may be an on-screen keyboard) to input data into the computer system 400. The graphics adapter 412 causes images and other information to be displayed on the display 418. The network adapter 416 couples the computer system 400 to one or more computer networks (e.g., network 190). The types of computers used by the entities of FIG. 1 can vary depending upon the embodiment and the processing power required by the entity. Furthermore, the computers can lack some of the components described above, such as keyboards 410, graphics adapters 412, and displays 418.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for providing hierarchical claim tokens. Thus, while particular embodiments and applications have been illustrated and described, it is to be understood that the described subject matter is not limited to the precise construction and components disclosed. The scope of protection should be limited only by any claims that may ultimately issue.

What is claimed is:

1. A computer-implemented method, comprising:

establishing, by one or more computing devices, custody of a digital asset by a first data object in a first tier of a hierarchy of tiers in a distributed ledger;

receiving, by the one or more computing devices, a request to assign an ownership or beneficial interest in the digital asset to a second data object in a second tier of the hierarchy of tiers in the distributed ledger, wherein the second data object includes an identifier of the first data object and has access permissions that enable the first data object to access the second data object while preventing access to the second data object by other data objects in the first tier of the hierarchy of tiers;

sending, by the one or more computing devices to a plurality of nodes of the distributed ledger, a request to verify that the first data object has custody of the digital asset;

receiving, by the one or more computing devices from at least a threshold amount of the plurality of nodes, verification of custody of the digital asset by the first data object; and responsive to the receiving the verification from at least the threshold amount of the plurality of nodes, storing, by the one or more computing devices in the second data object, a token representing the ownership or beneficial interest in the digital asset for which the first data object has custody.

2. The computer-implemented method of claim 1, wherein the first data object verifies custody of the digital asset using a digital signature of a registrar confirming that the first data object has custody of the digital asset.

3. The computer-implemented method of claim 1, wherein an owner of the first data object on the distributed ledger also has a risk account to hold one or more additional instances of the digital asset on behalf of the owner of the first data object, the risk account being a third data object in the first tier of the hierarchy of tiers in the distributed ledger.

4. The computer-implemented method of claim 1, wherein the second data object is one of a plurality of tiered accounts in the hierarchy of tiers, wherein each account in the hierarchy includes tokens representing ownership or beneficial interests in an immediately preceding tier of the hierarchy.

5. The computer-implemented method of claim 1, wherein the token representing the ownership or beneficial interest includes a digital signature of a custodian associated with the first data object.

6. The computer-implemented method of claim 5, further comprising:

receiving, from a third data object in a third tier of the hierarchy of tiers, a request to assign an ownership or beneficial interest in the token to the third data object;

verifying that the token is signed with the digital signature of the custodian; and responsive to the token being signed with the digital signature of the custodian, assigning, to the third data object, the ownership or beneficial interest in the token, wherein the ownership or beneficial interest in the token is one of a plurality of ownership or beneficial interests in the token assigned to different tier-three data objects in the distributed ledger.

7. The computer-implemented method of claim 1, wherein the ownership or beneficial interest in the digital asset is assigned to the second data object without modifying any data objects in the first tier of the hierarchy.

8. The computer-implemented method of claim 1, wherein the digital assets were issued by an issuer and credited to an issuer account, the issuer account comprising an issuer data object in the first tier of the hierarchy of tiers in the distributed ledger, the issuer account serving as a transactional account to hold the digital asset when the asset is first originated in the distributed ledger while not having custody of the digital asset.

9. The computer-implemented method of claim 1, wherein the second data object is one of a plurality of tier-two data objects, the plurality of tier-two data objects recording ownership or beneficial interests in different instances of the digital asset for which the first data object has custody.

10. The computer-implemented method of claim 1, wherein the first data object and the second data objects are smart contracts.

11. One or more non-transitory computer-readable storage media storing computer program instructions that, when executed, cause a computing system to perform operations comprising:

establishing, by one or more computing devices, custody of a digital asset by a first data object in a first tier of a hierarchy of tiers in a distributed ledger;

receiving, by the one or more computing devices, a request to assign an ownership or beneficial interest in the digital asset to a second data object in a second tier of the hierarchy of tiers in the distributed ledger, wherein the second data object includes an identifier of the first data object and has access permissions that enable the first data object to access the second data object while preventing access to the second data object by other data objects in the first tier of the hierarchy of tiers;

sending, by the one or more computing devices to a plurality of nodes of the distributed ledger, a request to verify that the first data object has custody of the digital asset;

receiving, by the one or more computing devices from at least a threshold amount of the plurality of nodes, verification of custody of the digital asset by the first data object; and responsive to the receiving the verification from at least the threshold amount of the plurality of nodes, storing, by the one or more computing devices in the second data object, a token representing the ownership or beneficial interest in the digital asset for which the first data object has custody.

12. The one or more non-transitory computer-readable media of claim 11, wherein the first data object verifies custody of the digital asset using a digital signature of a registrar confirming that the first data object has custody of the digital asset.

13. The one or more non-transitory computer-readable media of claim 11, wherein an owner of the first data object on the distributed ledger also has a risk account to hold one or more additional instances of the digital asset on behalf of the owner of the first data object, the risk account being a third data object in the first tier of the hierarchy of tiers in the distributed ledger.

14. The one or more non-transitory computer-readable media of claim 11, wherein the second data object is one of a plurality of tiered accounts in the hierarchy of tiers, wherein each account in the hierarchy includes tokens representing ownership or beneficial interests in an immediately preceding tier of the hierarchy.

15. The one or more non-transitory computer-readable media of claim 11, wherein the token representing the ownership or beneficial interest includes a digital signature of a custodian associated with the first data object.

16. The one or more non-transitory computer-readable media of claim 15, wherein the operations further comprise:

receiving, from a third data object in a third tier of the hierarchy of tiers, a request to assign an ownership or beneficial interest in the token to the third data object;

verifying that the token is signed with the digital signature of the custodian; and responsive to the token being signed with the digital signature of the custodian, assigning, to the third data object, the ownership or beneficial interest in the token, wherein the ownership or beneficial interest in the token is one of a plurality of ownership or beneficial interests in the token assigned to different tier-three data objects in the distributed ledger.

17. The one or more non-transitory computer-readable media of claim 11, wherein the ownership or beneficial interest in the digital asset is assigned to the second data object without modifying any data objects in the first tier of the hierarchy.

18. The one or more non-transitory computer-readable media of claim 11, wherein the digital assets were issued by an issuer and credited to an issuer account, the issuer account comprising an issuer data object in the first tier of the hierarchy of tiers in the distributed ledger, the issuer account serving as a transactional account to hold the digital asset when the asset is first originated in the distributed ledger while not having custody of the digital asset.

19. The one or more non-transitory computer-readable media of claim 11, wherein the second data object is one of a plurality of tier-two data objects, the plurality of tier-two data objects recording ownership or beneficial interests in different instances of the digital asset for which the first data object has custody.

20. A computing system comprising:

one or more processors; and one or more non-transitory computer-readable media storing instructions that, when executed by the one or more processors, cause the computing system to perform operations including:

establishing, by one or more computing devices, custody of a digital asset by a first data object in a first tier of a hierarchy of tiers in a distributed ledger;

receiving, by the one or more computing devices, a request to assign an ownership or beneficial interest in the digital asset to a second data object in a second tier of the hierarchy of tiers in the distributed ledger, wherein the second data object includes an identifier of the first data object and has access permissions that enable the first data object to access the second data object while preventing access to the second data object by other data objects in the first tier of the hierarchy of tiers;

sending, by the one or more computing devices to a plurality of nodes of the distributed ledger, a request to verify that the first data object has custody of the digital asset;

receiving, by the one or more computing devices from at least a threshold amount of the plurality of nodes, verification of custody of the digital asset by the first data object; and responsive to the receiving the verification from at least the threshold amount of the plurality of nodes, storing, by the one or more computing devices in the second data object, a token representing the ownership or beneficial interest in the digital asset for which the first data object has custody.

* * * * *